US012712741B2

(12) United States Patent
Hojjati

(10) Patent No.: US 12,712,741 B2
(45) Date of Patent: Aug. 18, 2026

(54) SYSTEMS AND METHODS FOR PROVIDING ALTERNATIVE WEBPAGE CONTENT TO NON-HUMAN VIEWERS

(71) Applicant: DigiCert, Inc., Lehi, UT (US)

(72) Inventor: Avesta Hojjati, Austin, TX (US)

(73) Assignee: DigiCert, Inc., Lehi, UT (US)

( * ) Notice: Subject to any disclaimer, the term of this patent is extended or adjusted under 35 U.S.C. 154(b) by 60 days.

(21) Appl. No.: 18/989,277

(22) Filed: Dec. 20, 2024

(65) Prior Publication Data

US 2026/0180812 A1 Jun. 25, 2026

(51) Int. Cl.
*H04L 29/06* (2006.01)
*H04L 9/32* (2006.01)

(52) U.S. Cl.
CPC .................................. *H04L 9/3263* (2013.01)

(58) Field of Classification Search
None
See application file for complete search history.

(56) References Cited

U.S. PATENT DOCUMENTS 8,856,869 B1 * 10/2014 Brinskelle ........... H04L 63/0823 726/2
11,107,141 B1 * 8/2021 Nagarajappa ...... G06Q 30/0617
12,088,739 B2 9/2024 Hojjati
12,386,956 B1 * 8/2025 Khan ...................... G06F 21/56
12,477,002 B2 * 11/2025 Lewis ................... H04L 63/083
2008/0086522 A1 * 4/2008 Biggs .................. H04L 63/0245 709/202
2011/0145218 A1 * 6/2011 Meyerzon ........... G06F 16/9535 707/E17.014
2013/0067023 A1 * 3/2013 Joy ..................... H04L 63/0421 709/217
2014/0325596 A1 * 10/2014 Edwards ................ H04L 63/08 726/3
2015/0012521 A1 * 1/2015 Grim, III ............ G06F 16/9558 707/711
2015/0128247 A1 * 5/2015 Rapaport ................ G06F 21/51 726/13
2017/0237766 A1 * 8/2017 Mattson ................ G06F 21/568 726/23
2019/0124160 A1 * 4/2019 Dhamnani ............ H04L 67/146
2019/0370493 A1 * 12/2019 Deutschmann ..... H04L 63/0861
2021/0058346 A1 * 2/2021 Albrecht ............. H04L 12/1813
(Continued)

*Primary Examiner* — Shin-Hon (Eric) Chen
(74) *Attorney, Agent, or Firm* — Baratta Law PLLC; Lawrence A. Baratta, Jr.

(57) ABSTRACT

Systems and methods for controlling automated access to webpage content include receiving, by a web server, a request for a webpage from a client device; determining, by analyzing one or more request parameters or behavioral indicators, that the client device is a bot rather than a human-operated client; obtaining, from the bot, an x.509 certificate; validating the x.509 certificate to authenticate the bot's identity; retrieving metadata from the validated x.509 certificate, the metadata comprising at least one of: a bot type, authorized content categories, permitted request frequencies, or intended usage policies; comparing the retrieved metadata against predefined access rules stored by the web server; and serving the requested webpage content or a modified version thereof based on the comparison, thereby ensuring that the bot's access aligns with its authorized permissions.

14 Claims, 3 Drawing Sheets

(56) References Cited

U.S. PATENT DOCUMENTS

2023/0153136 A1* 5/2023 Dennis .................... G06F 21/31
717/115
2023/0185586 A1* 6/2023 Dey .................... G06F 9/44589
717/126
2023/0300129 A1 9/2023 Hojjati et al.
2023/0344639 A1 10/2023 Hojjati
2023/0385811 A1 11/2023 Naidoo et al.
2024/0096051 A1 3/2024 Gopalakrishna et al.
2024/0249029 A1 7/2024 Hojjati
2024/0331357 A1 10/2024 Hojjati
2024/0340637 A1 10/2024 Sabin et al.
2025/0141698 A1* 5/2025 Hojati ....................... H04L 9/30

* cited by examiner

SYSTEMS AND METHODS FOR PROVIDING ALTERNATIVE WEBPAGE CONTENT TO NON-HUMAN VIEWERS

FIELD OF THE DISCLOSURE

The present disclosure generally relates to computer and networking systems and methods. More particularly, the present disclosure relates to systems and methods for providing alternative webpage content to non-human viewers.

BACKGROUND OF THE DISCLOSURE

Bots and crawlers, often referred to as automated agents or non-human viewers, are software applications designed to systematically navigate the internet and retrieve information from web servers, commonly for the purposes of indexing, data aggregation, or automated testing. These automated entities employ network protocols such as hypertext transfer protocol (HTTP) to access webpages in a manner similar to human users, but do so without the need for direct human input. A crawler, for instance, may begin at a known uniform resource locator (URL) and follow hyperlinks within the retrieved content to discover additional pages, thereby allowing it to gather large amounts of information efficiently and continuously. While bots and crawlers function as vital tools for maintaining searchable and structured online content, their automated nature can also lead to misuse, such as attempts to extract proprietary data or artificially inflate webpage traffic metrics, making it critical to differentiate and appropriately respond to non-human visits.

BRIEF SUMMARY OF THE DISCLOSURE

The present disclosure relates to systems and methods for providing alternative webpage content to non-human viewers. Specifically, the present disclosure introduces a method to authenticate and control bot and crawler activity on webpages using x.509 certificates. By requiring bots to present valid certificates containing metadata such as bot type, permissions, and access policies, site owners can enforce precise and adaptive rules. This system enables limiting bot access frequency, restricting certain content types, and detecting unauthorized or malicious behaviors in real-time, ultimately protecting sensitive data and reducing server strain.

Utilizing x.509 certificates to authenticate and control bot and crawler activity provides several key benefits. First, it allows for robust, verifiable authentication, ensuring that only approved automated agents, rather than unverified or malicious bots, gain access to a website's resources. By embedding metadata such as bot type, operational constraints, and permission sets directly into the certificate, site owners can exercise granular control over what content is provided and at what rate, thereby mitigating unauthorized data scraping or server overload. This certificate-based approach also facilitates real-time monitoring and policy enforcement: if a bot deviates from its defined parameters—such as attempting to access restricted areas or exceeding frequency limits—its behavior can be swiftly flagged and remedial measures can be taken. Furthermore, integrating x.509 certificates aligns well with existing security infrastructures, leveraging standardized cryptographic protocols and identity management systems. Overall, this method promotes a more trustworthy, efficient, and secure online ecosystem by reducing illicit automated traffic and ensuring that beneficial bots can operate under clear, enforceable guidelines.

BRIEF DESCRIPTION OF THE DRAWINGS

The present disclosure is detailed through various drawings, where like components or steps are indicated by identical reference numbers for clarity and consistency.

DETAILED DESCRIPTION OF THE DISCLOSURE

Again, the present disclosure relates to systems and methods for providing alternative webpage content to non-human viewers.

Conventionally, when bots and crawlers access a webpage, they systematically navigate through its structure and analyze its content, either to index information for improved searchability or to retrieve specific data for various applications. For example, reputable search engine crawlers "crawl" through pages by following hyperlinks and cataloging content, thus ensuring web materials remain discoverable. Other types of bots, however, may serve different objectives-such as aggregating market data, monitoring competitor pricing, testing site performance, or even probing for security vulnerabilities. While legitimate bots can provide substantial benefits, including more thorough content indexing and real-time data monitoring, they also introduce challenges. High volumes of unauthorized or resource-intensive bot traffic can significantly strain server performance, slow page load times, and inflate operational costs. Additionally, malicious bots may scrape sensitive information, bypass standard access controls, or launch automated attacks against web infrastructure. As a result, differentiating between beneficial and harmful bots, regulating their activities, and maintaining balanced access have become critical aspects of modern web security, resource management, and overall site performance.

Managing Bot and Crawler Access to Webpages

Figure 1:
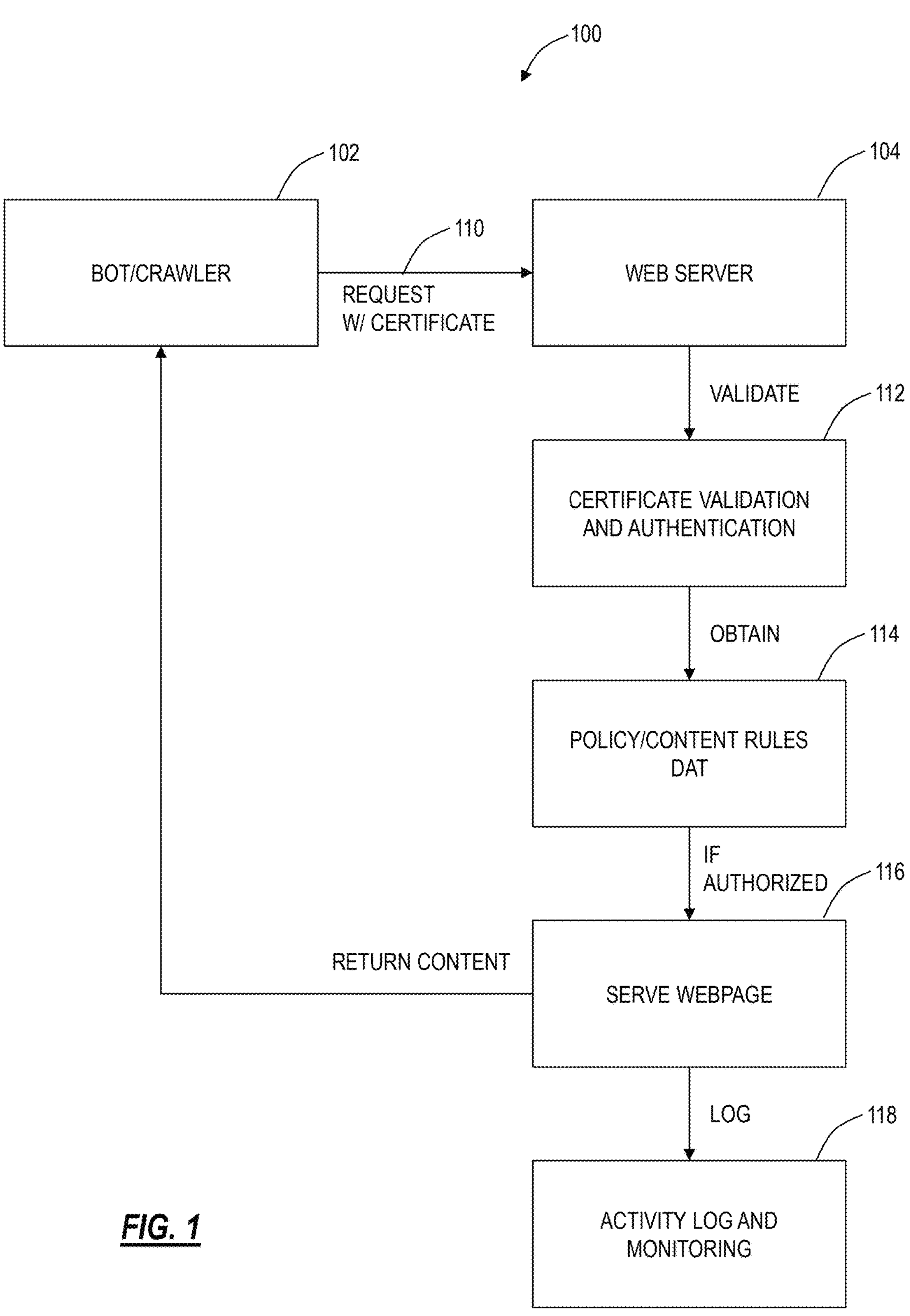
FIG. 1 illustrates a system with a multi-step workflow for managing and regulating bot and crawler access to webpages through x.509 certificate-based authentication and policy enforcement mechanisms.

FIG. 1 illustrates a multi-step workflow 100 for managing and regulating bot and crawler access to webpages through x.509 certificate-based authentication and policy enforcement mechanisms. A bot/crawler 102 block represents an automated client device attempting to access a web server 104. The bot/crawler 102 is an automated software application designed to interact with the web server 104 without direct human intervention. These programs systematically scan, retrieve, and process online content following predefined instructions or rules. For example, search engine crawlers navigate from webpage to webpage via hyperlinks, cataloging information about page structure, text content, and metadata. This process helps ensure that relevant content can be indexed and retrieved in response to user queries.

Beyond search indexing, the bot/crawler 102 can serve various purposes, such as gathering market data, monitoring website uptime, or performing security audits by checking for vulnerabilities. Some bots act within authorized bounds, respecting site policies and access limits, while others may engage in unauthorized scraping or high-frequency requests that can strain servers or compromise sensitive data. As a result, distinguishing between beneficial and harmful bots, and managing their level of access, is an essential aspect of maintaining web security and performance.

The web server 104 can include an added layer of inspection to determine whether the incoming request originates from a human-operated browser or from the bot/crawler 102. The web server 104 may analyze various request parameters and behavioral indicators at the network and application layers—such as request frequency, navigation patterns, HTTP headers, or transport layer security (TLS) handshake characteristics—to make this determination.

The web server 104 receives the incoming request over standard Internet protocols. The web server 104 is a specialized software system designed to store, process, and deliver webpages and associated resources to clients over the internet. When a user's browser or another client device sends a request for a webpage, the web server locates the requested files—such as hypertext markup language (HTML) documents, images, or scripts—and sends them back as a response following standardized protocols like HTTP or HTTPS. Beyond simply retrieving content, modern web servers often incorporate functionality such as load balancing, caching, and security measures to handle high volumes of traffic efficiently, protect against malicious activity, and ensure a smooth browsing experience. Their fundamental role is to act as the backbone of the World Wide Web, enabling continuous, reliable, and secure access to online information and services.

In addition to processing standard HTTP/S requests, the web server 104 can incorporate functionality—either natively or via integrated modules—to perform bot detection before proceeding with authentication steps. If the server's 104 initial analysis identifies the client as the bot/crawler 102, it can require an x.509 certificate from that bot/crawler 102, which must be presented at this early stage of the connection (e.g., during TLS client authentication). This step enforces that bot/crawlers 102 are not only identified but also verified against a known identity framework.

In accordance with the present disclosure, the bot/crawler 102 is configured with an x.509 certificate which is provided with or in conjunction with the incoming request (step 110). With the x.509 certificate, a certificate validation and authentication block 112 takes the x.509 certificate supplied by the bot/crawler 102 and validates it. Validation involves cryptographic checks to ensure the certificate is signed by a trusted certificate authority (CA), is not expired or revoked, and matches a recognized bot identity. The certificate may include custom extensions that encode metadata about the bot/crawler's 102 intended behavior, such as permitted content categories, request frequency limits, or specific usage policies. By extracting this metadata, the web server 104 gains a granular view of what the bot/crawler 102 is authorized to do.

The certificate validation and authentication block 112 operates by performing a series of cryptographic and logical checks against the x.509 certificate presented by the bot/crawler 102. First, it confirms the certificate's authenticity by verifying its digital signature against a known and trusted CA public key. This involves checking that the certificate's chain of trust leads back to a CA that the server recognizes. The validation process also ensures the certificate is not expired or revoked, typically by examining its validity dates and consulting revocation mechanisms such as certificate revocation lists (CRLs) or the online certificate status protocol (OCSP). Additionally, the block 112 inspects fields within the certificate—such as the subject and subject alternative name extensions—to confirm they match the expected identity of the bot/crawler 102. If required, the block 112 may also parse custom certificate extensions containing the bot's authorized parameters and policies, verifying they conform to an expected format and policy schema.

The bot/crawler 102 itself obtains its x.509 certificate through a provisioning process that usually begins with the bot operator. The operator generates a cryptographic key pair—consisting of a private key and a corresponding public key—and creates a certificate signing request (CSR) containing the bot's identification details and public key. This CSR is submitted to a trusted CA or a dedicated bot management service, which evaluates the request and, if satisfied, issues an x.509 certificate binding the bot's identity to its public key. The operator then installs this issued certificate and private key onto the bot's software instance. When the bot makes a request to the web server, it can present this certificate during the TLS handshake, allowing the server's certificate validation and authentication block to verify the bot's identity and authorized status.

Once the web server 104 determines the x.509 certificate is valid, a policy/content rules database block 114 stores predefined access rules and policies keyed by bot type, identity, or other attributes derived from the bot's certificate metadata. For example, one bot/crawler 102 might be authorized to index product pages up to a certain rate, while another is limited to retrieving only high-level metadata. The decision engine in the web server 104 compares the bot's certificate metadata against these policies, ensuring only authorized behaviors and content retrieval are permitted.

If the bot's identity and metadata align with the stored policies, the process moves downward to a serve webpage block 116. Here, the web server 104 provides either the requested content or a version tailored to the bot's permitted access level—potentially stripping sensitive data or limiting certain page elements. For example, if the bot/crawler 102 is only authorized to access textual content or certain page types, the web server 104 dynamically modifies the response accordingly. These steps emphasize that content serving decisions are contingent upon adherence to authorized parameters and frequency limits.

An activity log and monitoring block 118, connected downstream, continuously records all interactions and decisions. This logging might include timestamped entries of each request, the policies applied, and any enforcement actions taken. By maintaining a comprehensive log, the web server 104 can perform ongoing analyses of bot/crawler 102 behavior over time—identifying patterns, detecting attempts to exceed allowed frequencies, or noting unauthorized content requests. When deviations from authorized behavior occur, the web server 104 can promptly block the bot/crawler 102 or adjust its permissions in real time. Additionally, administrators can be alerted immediately if suspicious activities or policy violations are detected, enabling swift remedial actions.

Detecting Non-Human (Bot) Versus Human Users

Detecting non-human (bot) versus human users accessing a web server can be achieved using a combination of behavioral analytics, technical indicators, and anomaly detection techniques:

Behavioral Signatures: Request Frequency and Patterns: Human users typically navigate a site with natural pauses, irregular timing, and varied browsing depth. In contrast, bots often issue rapid, evenly spaced requests, systematically visiting large numbers of pages. Monitoring request timestamps and inter-request intervals can help identify patterns characteristic of automated traffic.

Navigation Flow Analysis: Humans tend to explore pages in non-linear, interest-driven patterns. They may hover over menus, spend time reading content, and follow intuitive next-page links. Bots, by comparison, frequently traverse pages systematically (e.g., crawling every link on a page) or focus narrowly on certain data types, resulting in predictable or repetitive navigation paths.

Technical Indicators: User-Agent and Header Analysis: Although some bots attempt to mimic genuine browsers, many still send user agents or HTTP headers that stand out as unusual or too simplistic. By analyzing the presence and complexity of headers—such as detailed language settings, cookies, or caching indicators—a server can differentiate between standard browsers and lightweight, scripted agents.

TLS and Network Fingerprinting: Humans typically use common browsers that exhibit characteristic network signatures and TLS handshake patterns. Bots might use libraries or scripts with unique TLS signatures or support fewer cipher suites. Identifying unusual connection patterns, repetitive IP usage, or constant, unvarying TLS fingerprints can point to automated clients rather than genuine user devices.

Machine Learning and Anomaly Detection: Statistical Modeling of Behavior: By building statistical or machine learning models of normal user activity—such as the average time spent on pages, the range of interacted links, and average session length—deviations from these baselines can be flagged. For instance, if a client consistently requests resources at near-identical intervals or accesses rarely visited portions of the site without normal navigation patterns, these anomalies can indicate non-human activity.

Heuristic Analysis of Content Requests: Bots may focus on content that offers little value to casual browsers, such as metadata pages, structured data endpoints (like application programming interfaces (APIs)), or repetitive requests for the same resource. Detecting these patterns, especially if they persistently appear from the same source, suggests an automated process rather than organic human browsing behavior.

In combination, these methods allow the web server 104 to classify traffic sources more accurately. By continuously adapting and refining detection criteria through logged interactions and historical data analysis, site owners can maintain an evolving defense that identifies new types of bot behavior without disrupting normal user experiences.

With the present disclosure, upon detecting that the accessing entity is a bot/crawler 102, and identifying that the entity does not possess or present the required x.509 certificate, the system can preemptively block or deny its request before granting access to the web server 104. This detection may be based on factors such as unusual request frequency, distinct HTTP headers, known crawler signatures, or predetermined behavioral patterns that differentiate automated agents from human users. By enforcing a strict certificate requirement, the web server 104 ensures that only vetted and trusted bots—those that have obtained and can present a valid x.509 certificate—are permitted to interact with its resources. This additional layer of authentication protects sensitive data, preserves server bandwidth, and upholds the integrity of the hosting environment.

Example Computing System Architecture

Figure 2:
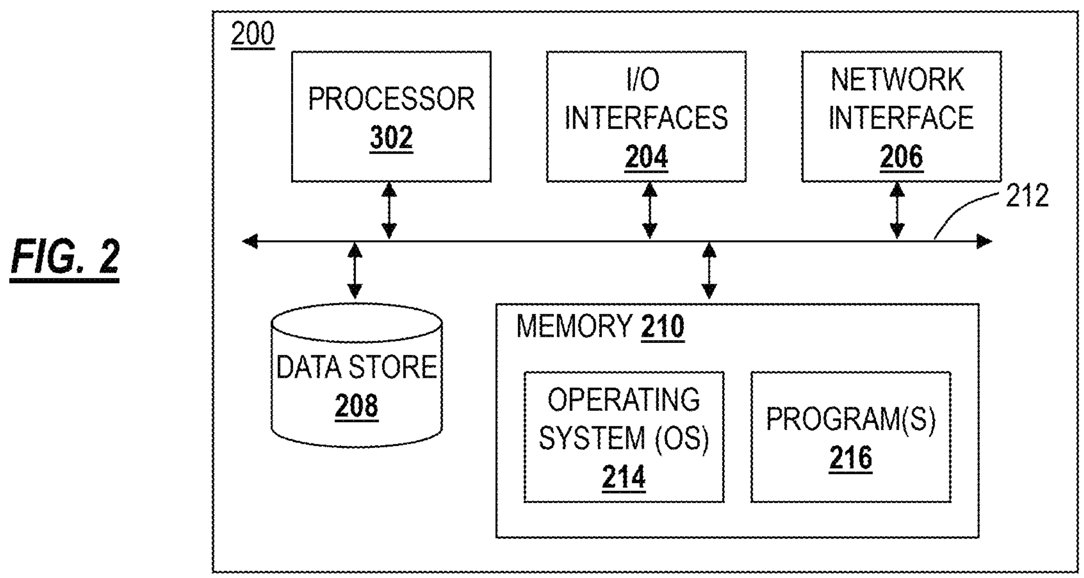
FIG. 2 illustrates a block diagram of a computing system which can serve as a foundational platform for various elements, including the web server and the bot/crawler, in the multi-step workflow of FIG. 1.

FIG. 2 illustrates a block diagram of a computing system 200 which can serve as a foundational platform for various elements, including the web server 104 and the bot/crawler 102. This computing system 200 is highly adaptable and can be implemented using a broad spectrum of underlying infrastructure models, such as dedicated physical servers, dynamically scaled clusters, virtual machines (VMs) managed by hypervisors, or even serverless computing frameworks. Regardless of the chosen deployment model, the computing system 200 typically includes a processor 202, input/output (I/O) interfaces 204, a network interface 206, a data store 208, and memory 210. These fundamental components, working in concert, enable the computing system 200 to run the web server 104, which enforces stringent access controls and demands x.509 certificates from bots and crawlers 102 for reliable identity verification and authentication. Through this approach, the web server 104 not only protects sensitive data but also ensures that its underlying resources are only accessed by authorized, well-credentialed automated clients.

It should be noted that FIG. 2 is a simplified representation of the computing system 200, and practical, production-grade environments may incorporate additional hardware and software components to enhance performance, scalability, and security. Such enhancements can include accelerators, GPUs, FPGAs, dedicated cryptographic modules, as well as software orchestration layers like containers, virtualization stacks, caching systems, and load balancers. The depicted components (202, 204, 206, 208, and 210) are interconnected by a local interface 212, which may include advanced, high-speed interconnects such as PCIe fabrics, optical links, or multi-layer switch networks. This interface 212 supports addressing, buffering, and other control functions that optimize intra-system communication, ensuring that all elements—from processors executing cryptographic checks to data stores holding policy rules—operate efficiently and securely. The integrated nature of these resources facilitates seamless interaction among the web server 104, the underlying cryptographic modules, and any bot/crawler 102 authentication services.

The processor 202, which can be a CPU, multicore processor, system-on-chip (SoC), or part of a larger compute cluster, is responsible for executing instructions stored in memory 210. It orchestrates I/O operations, manages data exchanges with the data store 208, and coordinates the overall workflow among various components. In the context of managing access control, the processor 202 performs cryptographic validation steps to verify that a bot/crawler 102 possesses a valid x.509 certificate. This verification may involve checking certificate expiration dates, revocation lists, or signature authenticity against trusted certificate authorities. As traffic scales, multiple processors, or a distributed network of compute nodes, can concurrently process requests and validation tasks, ensuring rapid response times and maintaining system availability even under heavy load.

The I/O interfaces 204 connect the computing system 200 to external peripherals and specialized hardware devices that might assist in tasks such as hardware-accelerated cryptography or offline data storage. Meanwhile, the network interface 206 provides secure, often encrypted connectivity to external networks, data centers, and the broader internet. Through this network interface, the computing system 200 can receive incoming requests from the bot/crawler 102 located anywhere in the world. As requests arrive, the web server 104 consults the data store 208—which stores configuration files, certificate policies, and logging information—to determine the appropriate response. The memory 210 holds the active runtime state, including the operating system (O/S) 214 and any executing programs 216, which implement the business logic and security policies of the web server 104. These policies may detail how to handle various types of bots/crawlers 102, including the criteria for granting access based on presented certificates and defined trust relationships.

In summary, the computing system 200 offers a robust and scalable platform for hosting the web server 104, enforcing strict certificate-based authentication for bots and crawlers 102, and integrating seamlessly with a variety of hardware and software enhancements. By carefully coordinating the roles of processors, memory, storage, and networking components, and by leveraging a flexible, high-performance local interface 212, the computing system 200 ensures that services like the web server 104 can deliver secure, controlled access to automated clients. This integrated environment safeguards sensitive data, supports dynamic policy enforcement, and adapts to evolving traffic patterns, providing a reliable foundation for modern web infrastructures and secure software development workflows.

Process

Figure 3:
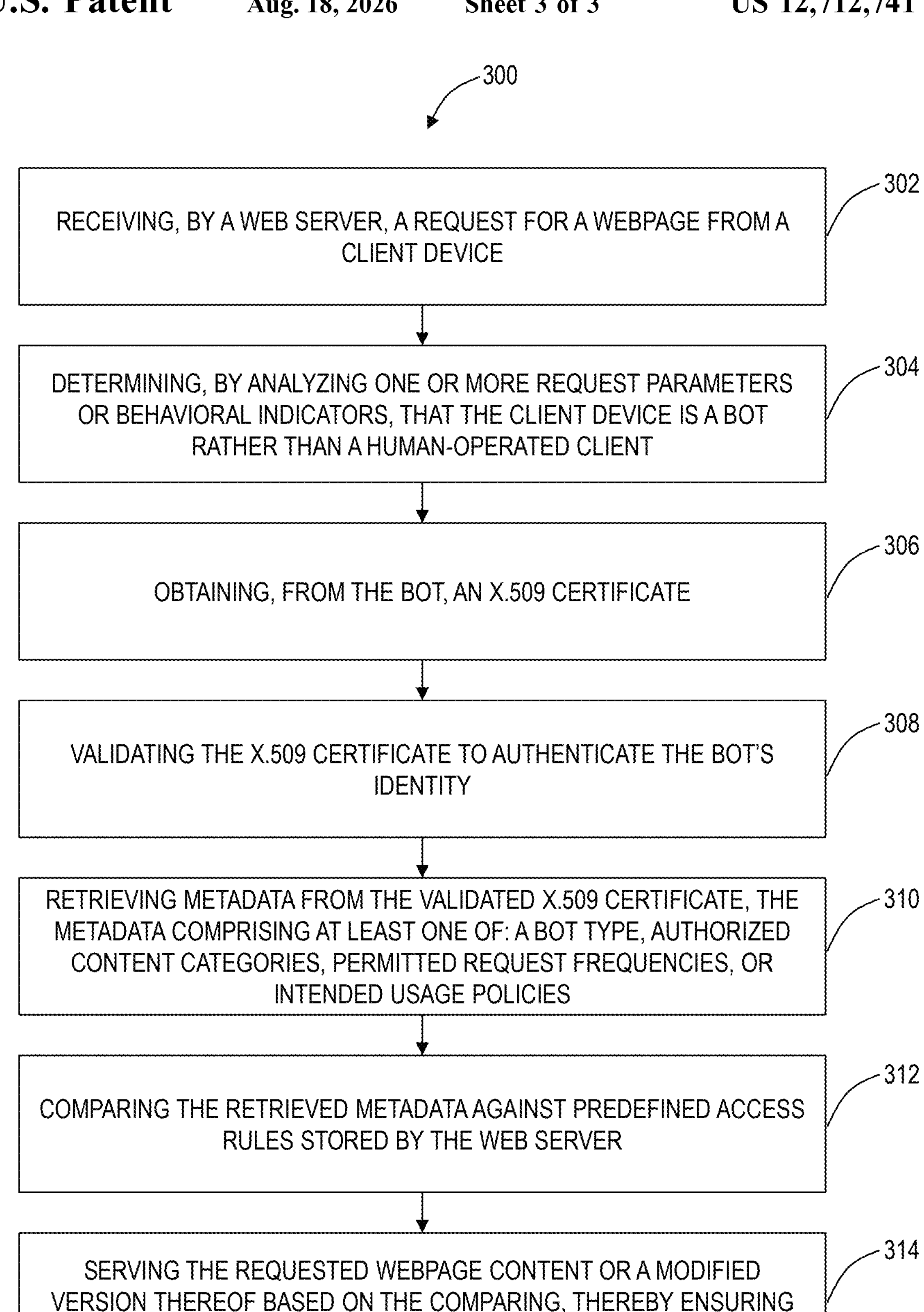
FIG. 3 illustrates a flowchart of a process for controlling automated access to webpage content.

FIG. 3 illustrates a flowchart of a process 300 for controlling automated access to webpage content. The process 300 may be implemented as a series of method steps executed by the computing system 200, or a similar platform configured to perform these steps. Additionally, the process 300 may be embodied on a non-transitory computer-readable medium storing instructions that, when executed by one or more processors, cause the computing system to carry out the described steps.

The steps include receiving, by a web server, a request for a webpage from a client device (step 302); determining, by analyzing one or more request parameters or behavioral indicators, that the client device is a bot rather than a human-operated client (step 304); obtaining, from the bot, an x.509 certificate (step 306); validating the x.509 certificate to authenticate an identity of the bot (step 308); retrieving metadata from the validated x.509 certificate, the metadata comprising at least one of: a bot type, authorized content categories, permitted request frequencies, or intended usage policies (step 310); comparing the retrieved metadata against predefined access rules stored by the web server (step 312); and serving the requested webpage content or a modified version thereof based on the comparing, thereby ensuring that the bot's access aligns with its authorized permissions (step 314).

The steps can include restricting access to selected content categories or webpage elements when the retrieved metadata indicates that the bot is not authorized to view such content, thereby preventing unauthorized data extraction. The steps can include monitoring a request frequency from the bot and throttling or denying subsequent requests if the bot exceeds an authorized rate defined by the retrieved metadata or the predefined access rules, thereby mitigating excessive server load. The steps can include logging interactions with the bot, including timestamps, requested pages, and enforcement decisions made by the web server, to facilitate subsequent analysis of the bot's behavior and its compliance with authorized policies. The steps can include detecting unauthorized behavior by the bot, wherein unauthorized behavior comprises attempts to access restricted content, exceed defined frequency limits, or violate other predefined policies, and in response blocking or terminating the bot's access in real time.

The predefined access rules can be dynamically updated, and the steps can further include adjusting the bot's access permissions in real time in accordance with changes to the associated policies or certificate metadata, thereby ensuring current and contextually relevant access controls. The metadata in the x.509 certificate can include cryptographic signatures or unique identifiers that enable secure, certificate-based identity management, thereby confirming that the bot operates under a recognized and trusted identity. The steps can include integrating the certificate validation process with existing identity management systems to streamline the administration of bot authentication, policy enforcement, and certificate revocation.

The steps can include detecting deviations from the bot's authorized parameters and providing real-time alerts to an administrative interface, thereby enabling immediate remedial action against suspicious or unapproved activities. The serving the webpage content based on the comparison of metadata and predefined access rules optimizes server resource utilization, safeguards sensitive data, and prevents unauthorized data scraping by ensuring that only compliant bots receive appropriate access.

x.509 Certificate

An x.509 certificate for a bot is a digitally signed, cryptographic document that binds the bot's identity to a specific public key and provides verifiable trust information. Issued by a recognized CA, this certificate contains fields identifying the bot, such as a domain name or a unique identifier, as well as metadata describing its intended use and operational constraints. For instance, custom extensions in the certificate may declare the bot's authorized content categories, permitted request frequencies, or the nature of its crawling activities. The certificate also includes validity periods, cryptographic signatures, and potentially revocation pointers, ensuring that recipient servers can confirm that the bot is recognized and currently trusted. By presenting such a certificate during a secure connection, the bot can prove its legitimacy, allowing web servers to differentiate it from unverified automated traffic, enforce fine-grained access controls, and maintain overall data security and site performance.

Employing x.509 certificates to constrain bot access to web servers provides several key benefits that enhance security, performance, and manageability. First, these certificates establish a verifiable cryptographic identity for each bot, allowing web servers to distinguish between trusted, authorized bots and unauthorized or malicious automated traffic. By requiring bots to present valid certificates, site owners can enforce precise policies—such as limiting page requests, restricting certain types of content, and defining acceptable crawling intervals—that are embedded directly into the bot's credentials. This fine-grained control helps prevent resource-intensive scraping or denial-of-service attacks, reducing server strain and maintaining a high quality of service for legitimate users. Moreover, the certificate-based approach integrates smoothly with existing security infrastructures and identity management systems, streamlining policy updates, certificate revocations, and real-time adjustments. As a result, site owners gain a scalable, adaptable means of regulating automated access, safeguarding sensitive data, and optimizing server performance.

Differentiation

The web server 104 can differentiate content delivery for bots and human users by employing detection and authorization mechanisms at the request-handling stage and then tailoring the resulting responses accordingly. When a request arrives, the server 104 first determines if the client is a human user or a bot, for example, by analyzing the connection's characteristics, request patterns, or by requiring a bot to present a valid x.509 certificate. For human users—who typically navigate using standard web browsers and exhibit more natural interaction patterns—the server 104 provides the full, richly formatted webpage as intended, including all images, scripts, and interactive elements. In contrast, when the server 104 recognizes a requesting client as a bot, it may apply certain rules or restrictions defined in the bot's policy metadata. These could include serving only partial or text-only versions of a page, omitting sensitive data fields, reducing the number of dynamically generated elements, or enforcing stricter rate limits on how many pages can be requested within a given timeframe. By customizing responses based on client type, the server 104 ensures that legitimate human visitors enjoy a full, user-friendly browsing experience, while automated bots receive only the data deemed appropriate, thereby safeguarding resources and reducing unauthorized data extraction.

Processing Circuitry and Non-Transitory Computer-Readable Mediums

Those skilled in the art will recognize that the various embodiments may include processing circuitry of various types. The processing circuitry might include, but are not limited to, general-purpose microprocessors; central processing units (CPUs); digital signal processors (DSPs); specialized processors such as network processors (NPs) or network processing units (NPUs), graphical processing units (GPUs); field programmable gate arrays (FPGAs); programmable logic device (PLD), or similar devices. The processing circuitry may operate under the control of unique program instructions stored in their memory (software and/or firmware) to execute, in combination with certain non-processor circuits, either a portion or the entirety of the functionalities described for the methods and/or systems herein. Alternatively, these functions might be executed by a state machine devoid of stored program instructions, or through one or more application-specific integrated circuits (ASICs), where each function or a combination of functions is realized through dedicated logic or circuit designs. Naturally, a hybrid approach combining these methodologies may be employed. For certain disclosed embodiments, a hardware device, possibly integrated with software, firmware, or both, might be denominated as circuitry, logic, or circuits "configured to" or "adapted to" execute a series of operations, steps, methods, processes, algorithms, functions, or techniques as described herein for various implementations.

Additionally, some embodiments may incorporate a non-transitory computer-readable storage medium that stores computer-readable instructions for programming any combination of a computer, server, appliance, device, module, processor, or circuit (collectively "system"), each equipped with processing circuitry. These instructions, when executed, enable the system to perform the functions as delineated and claimed in this document. Such non-transitory computer-readable storage mediums can include, but are not limited to, hard disks, optical storage devices, magnetic storage devices, read-only memory (ROM), programmable read-only memory (PROM), erasable programmable read-only memory (EPROM), electrically erasable programmable read-only memory (EEPROM), flash memory, etc. The software, once stored on these mediums, includes executable instructions that, upon execution by one or more processors or any programmable circuitry, instruct the processor or circuitry to undertake a series of operations, steps, methods, processes, algorithms, functions, or techniques as detailed herein for the various embodiments.

CONCLUSION

In this disclosure, including the claims, the phrases "at least one of" or "one or more of" when referring to a list of items mean any combination of those items, including any single item. For example, the expressions "at least one of A, B, or C," "at least one of A, B, and C," "one or more of A, B, or C," and "one or more of A, B, and C" cover the possibilities of: only A, only B, only C, a combination of A and B, A and C, B and C, and the combination of A, B, and C. This can include more or fewer elements than just A, B, and C. Additionally, the terms "comprise," "comprises," "comprising," "include," "includes," and "including" are intended to be open-ended and non-limiting. These terms specify essential elements or steps but do not exclude additional elements or steps, even when a claim or series of claims includes more than one of these terms.

Although operations, steps, instructions, blocks, and similar elements (collectively referred to as "steps") are shown or described in the drawings, descriptions, and claims in a specific order, this does not imply they must be performed in that sequence unless explicitly stated. It also does not imply that all depicted operations are necessary to achieve desirable results. In the drawings, descriptions, and claims, extra steps can occur before, after, simultaneously with, or between any of the illustrated, described, or claimed steps. Multitasking, parallel processing, and other types of concurrent processing are also contemplated. Furthermore, the separation of system components or steps described should not be interpreted as mandatory for all implementations; also, components, steps, elements, etc. can be integrated into a single implementation or distributed across multiple implementations.

While this disclosure has been detailed and illustrated through specific embodiments and examples, it should be understood by those skilled in the art that numerous variations and modifications can perform equivalent functions or achieve comparable results. Such alternative embodiments and variations, even if not explicitly mentioned but that achieve the objectives and adhere to the principles disclosed herein, fall within the spirit and scope of this disclosure. Accordingly, they are envisioned and encompassed by this disclosure and are intended to be protected under the associated claims. In other words, the present disclosure anticipates combinations and permutations of the described elements, operations, steps, methods, processes, algorithms, functions, techniques, modules, circuits, and so on, in any conceivable order or manner—whether collectively, in subsets, or individually—thereby broadening the range of potential embodiments.

What is claimed is:

1. A method for controlling automated access to webpage content, the method comprising:

receiving, by a web server, a request for a webpage from a client device;

determining, by analyzing one or more request parameters or behavioral indicators, that the client device is a bot rather than a human-operated client;

obtaining, from the bot, an x.509 certificate;

validating the x.509 certificate to authenticate an identity of the bot;

retrieving metadata from the validated x.509 certificate, the metadata comprising at least one of: a bot type, authorized content categories, permitted request frequencies, or intended usage policies;

comparing the retrieved metadata against predefined access rules stored by the web server;

serving the requested webpage content or a modified version thereof based on the comparing, thereby ensuring that the bot's access aligns with its authorized permissions, mitigating excessive server load by monitoring a request frequency from the bot and throttling or denying subsequent requests when the bot exceeds an authorized rate defined by the retrieved metadata;

analyzing the bot's behavior and its compliance with authorized policies by logging interactions with the bot including timestamps, requested pages, and enforcement decisions made by the web server; and detecting unauthorized behavior by the bot, wherein unauthorized behavior comprises attempts to access restricted content or violate other predefined policies, and in response blocking or terminating the bot's access in real time.

2. The method of claim 1, further comprising:

restricting access to selected content categories or webpage elements when the retrieved metadata indicates that the bot is not authorized to view such content, thereby preventing unauthorized data extraction.

3. The method of claim 1, wherein the predefined access rules are dynamically updated, the method further comprising:

adjusting the bot's access permissions in real time in accordance with changes to associated policies or certificate metadata, thereby ensuring current and contextually relevant access controls.

4. The method of claim 1, wherein the metadata in the x.509 certificate includes cryptographic signatures or unique identifiers that enable secure, certificate-based identity management, thereby confirming that the bot operates under a recognized and trusted identity.

5. The method of claim 1, further comprising:

integrating a certificate validation process with existing identity management systems to streamline administration of bot authentication, policy enforcement, and certificate revocation.

6. The method of claim 1, further comprising:

detecting deviations from the bot's authorized parameters and providing real-time alerts to an administrative interface, thereby enabling immediate remedial action against suspicious or unapproved activities.

7. The method of claim 1, wherein serving the webpage content based on comparison of metadata and predefined access rules optimizes server resource utilization, safeguards sensitive data, and prevents unauthorized data scraping by ensuring that only compliant bots receive appropriate access.

8. A system for controlling automated access to webpage content, the system comprising:

one or more processors and memory storing instructions that, when executed, cause the one or more processors to receive a request for a webpage from a client device;

determine, by analyzing one or more request parameters or behavioral indicators, that the client device is a bot rather than a human-operated client;

obtain, from the bot, an x.509 certificate;

validate the x.509 certificate to authenticate an identity of the bot;

retrieve metadata from the validated x.509 certificate, the metadata comprising at least one of: a bot type, authorized content categories, permitted request frequencies, or intended usage policies;

compare the retrieved metadata against predefined access rules stored by a web server;

serve the requested webpage content or a modified version thereof based on the compare, thereby ensuring that the bot's access aligns with its authorized permissions, mitigating excessive server load by monitoring a request frequency from the bot and throttling or denying subsequent requests when the bot exceeds an authorized rate defined by the retrieved metadata;

analyzing the bot's behavior and its compliance with authorized policies by logging interactions with the bot including timestamps, requested pages, and enforcement decisions made by the web server; and detecting unauthorized behavior by the bot, wherein unauthorized behavior comprises attempts to access restricted content or violate other predefined policies, and in response blocking or terminating the bot's access in real time.

9. The system of claim 8, wherein the memory storing instructions that, when executed, further cause the one or more processors to:

restrict access to selected content categories or webpage elements when the retrieved metadata indicates that the bot is not authorized to view such content, thereby preventing unauthorized data extraction.

10. The system of claim 8, wherein the predefined access rules are dynamically updated, the memory storing instructions that, when executed, further cause the one or more processors to:

adjust the bot's access permissions in real time in accordance with changes to associated policies or certificate metadata, thereby ensuring current and contextually relevant access controls.

11. The system of claim 8, wherein the metadata in the x.509 certificate includes cryptographic signatures or unique identifiers that enable secure, certificate-based identity management, thereby confirming that the bot operates under a recognized and trusted identity.

12. The system of claim 8, wherein the memory storing instructions that, when executed, further cause the one or more processors to:

integrate certificate validation process with existing identity management systems to streamline administration of bot authentication, policy enforcement, and certificate revocation.

13. The system of claim 8, wherein the memory storing instructions that, when executed, further cause the one or more processors to:

detect deviations from the bot's authorized parameters and providing real-time alerts to an administrative interface, thereby enabling immediate remedial action against suspicious or unapproved activities.

14. The system of claim 8, wherein serving the webpage content based on comparison of metadata and predefined access rules optimizes server resource utilization, safeguards sensitive data, and prevents unauthorized data scraping by ensuring that only compliant bots receive appropriate access.

* * * * *